Jan. 21, 1958 M. S. BRUNNER 2,820,600
AIRCRAFT CONTROL SURFACE ASSEMBLY AND ACTUATING MECHANISM
Filed May 24, 1954 3 Sheets-Sheet 1

INVENTOR:
Maxine S. Brunner
By Hubert E. Metcalf
Her Patent Attorney

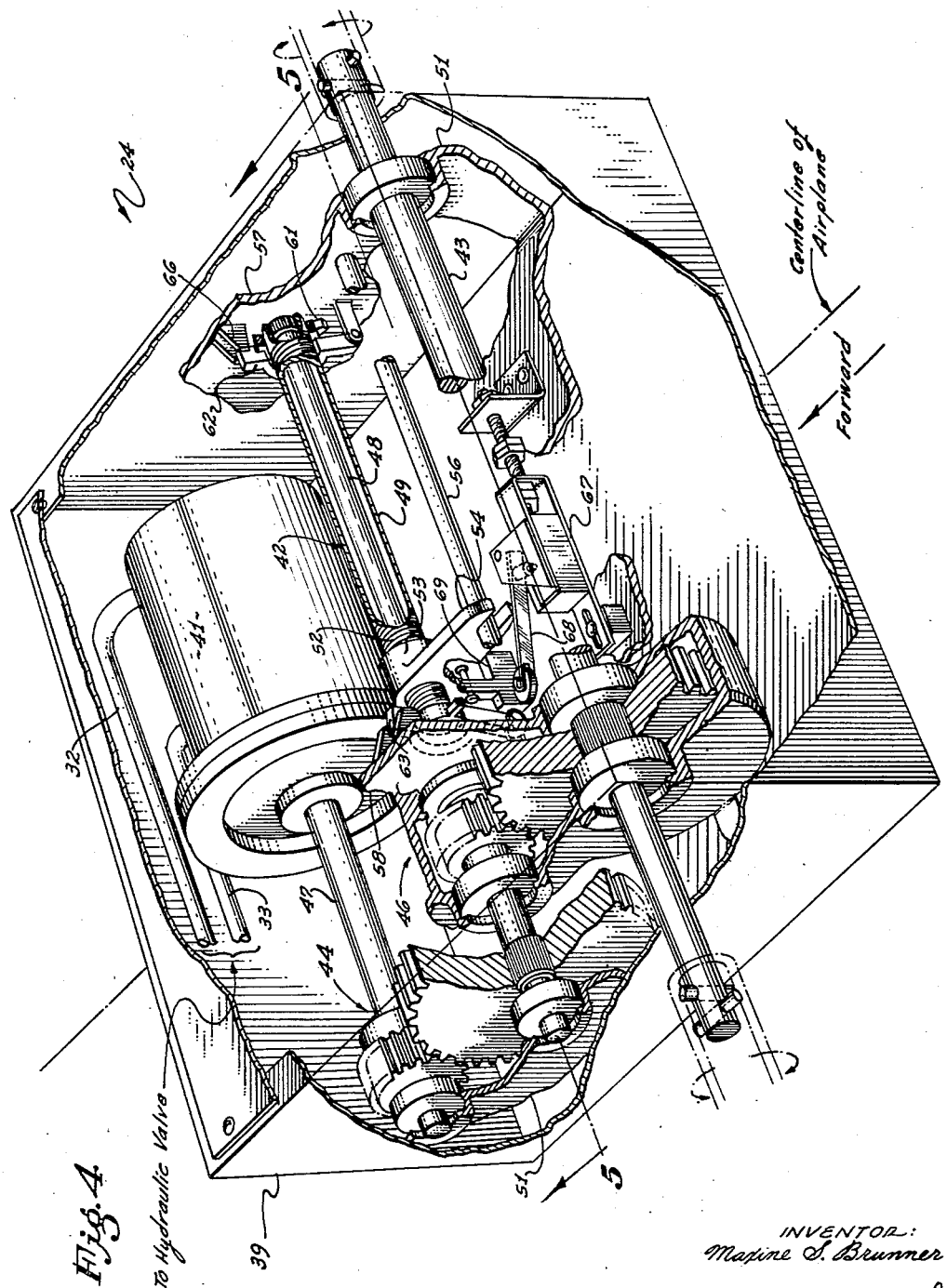

Jan. 21, 1958     M. S. BRUNNER     2,820,600
AIRCRAFT CONTROL SURFACE ASSEMBLY AND ACTUATING MECHANISM
Filed May 24, 1954     3 Sheets-Sheet 3
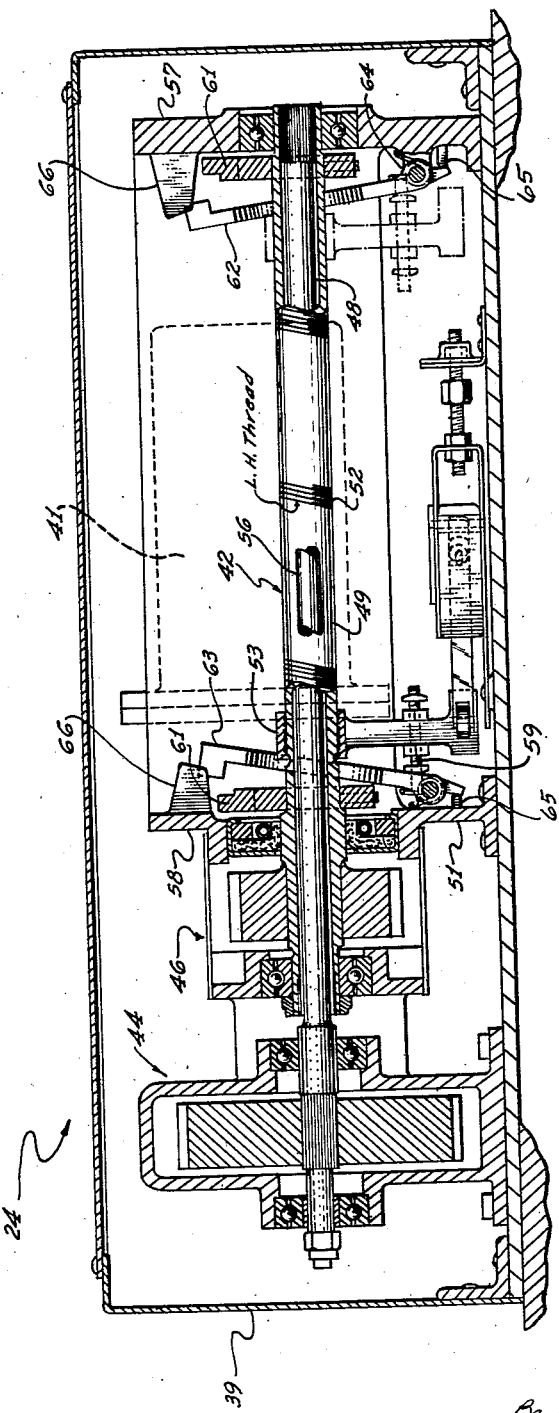

United States Patent Office 2,820,600
Patented Jan. 21, 1958

2,820,600

AIRCRAFT CONTROL SURFACE ASSEMBLY AND ACTUATING MECHANISM

Maxine S. Brunner, Torrance, Calif., assignor to Northrop Aircraft, Inc., Hawthorne, Calif., a corporation of California Application May 24, 1954, Serial No. 431,778

4 Claims. (Cl. 244—83)

The instant invention relates to aircraft construction and component parts thereof and more particularly to a hydraulic-mechanical mechanism adapted to actuate and position aircraft control surfaces and also embraces means rendering the above mechanism inoperative under certain conditions.

Physical limitations are quite frequently imposed on the component parts of a mechanism or structure by inherent characteristics of the mechanism or structure itself. This is particularly true in aircraft design and construction and especially so in present day high speed aircraft subject to be flown in hostile theatres of operation. It is apparent that aircraft of this character and component parts thereof must be of minimum size and weight compatible with sound engineering design. Safety devices should also receive special consideration in this connection. Non-conventional operating principles may be employed whereby the physical characteristics of component parts of an aircraft or the like may be maintained at a minimum as is the case in the instant invention. Certain parts of a conventional mechanism may be eliminated, other parts of the mechanism and associated parts reduced in size and weight by the novel construction, coaction, and arrangement of parts disclosed herein.

It is an object of the instant invention to provide a hydraulic-mechanical mechanism having a minimum of moving parts and adapted to operate and automatically position an aircraft control surface assembly or the like in either of two predetermined positions.

A further object is to provide a hydraulic-mechanical mechanism in which the output member thereof is not subjected to maximum torque loads occurring in the mechanism.

A further object is to provide a hydraulic-mechanical mechanism including a rotary hydraulic motor which assumes and is maintained in a stalled attitude during such times as certain operating parts of the mechanism assume predetermined relative positions.

A further object is to provide a hydraulic-mechanical mechanism including resilient members adapted to absorb maximum torque loads occurring in the mechanism.

A further object is to provide a hydraulic-mechanical mechanism adapted to operate and automatically position an aircraft control surface assembly or the like in which the mechanism is rendered inoperative in the event of damage to certain portions of the assembly.

A further object is to provide a hydraulic-mechanical mechanism portions of which may be abnormally light in size and weight, efficient and durable in operation, and economical to manufacture.

Briefly the instant invention pertains to a hydraulic-mechanical mechanism including a rotatable output member driven by a reversible rotary type hydraulic motor, the latter transmitting power to the output member through a plurality of torque absorbing members and suitable gearing. Rotary movement of one of the torque absorbing members being arrested, upon completing a predetermined number of revolutions, by a nut member traveling thereon to contact a pivotal stop located on a stationary portion of the device. During the time that the nut member and stop are in contacting relationship the motor assumes and is maintained in a stalled attitude. An electric circuit and switch means cooperate with the assembly and device rendering the latter inoperative should damage occur to the assembly. A clearer understanding of the device and its coaction with the assembly will be forthcoming from the following description of a preferred embodiment thereof.

The aforementioned and other objects will become more apparent from the following description and drawings in which like reference characters denote like parts. It is to be expressly understood, however, that the drawings are for the purpose of illustration only and not a definition of the limit of the invention, reference being had for this purpose to the appended claims.

In the drawings:

Figure 4 is a perspective view of the hydraulic-mechanical mechanism of the instant invention.

Figure 5 is a sectional view of the hydraulic-mechanical mechanism taken on the line 5—5 of Figure 4.

Figure 1:
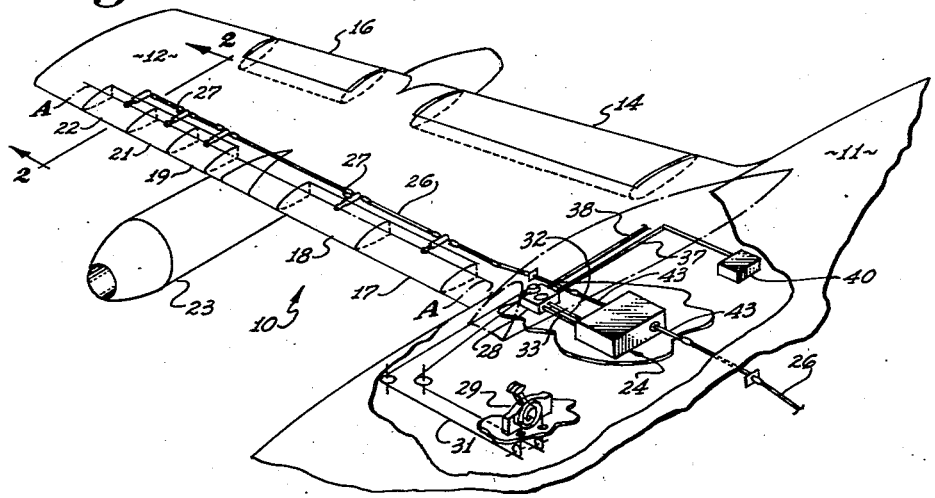
Figure 1 is a fragmentary perspective view of an airplane incorporating the features of the instant invention.

Referring to the drawings for a detailed description of a preferred embodiment of the instant invention, Figure 1 shows portions of an airplane 11 having a laterally extending wing 12. Although only one wing is shown it is to be understood that the following description also applies to an identical wing extending from the left side of the plane 11. The wing 12 is provided with a conventional flap 14 and aileron 16 on its trailing edge. The wing is also provided with a leading edge flap assembly 10 comprising five unitary flaps. Unitary flaps 17 and 18 are mounted between the plane's fuselage and nacelle 23 while unitary flaps 19, 21, and 22 are mounted outboard with respect to the nacelle.

Each of the leading edge flaps are mounted for pivotal movement between normal and lowered positions by cooperative effort of a hydraulic-mechanical mechanism 24, a torque tube 26, and a screw jack 27 associated with each unitary flap. Each flap pivots about a common axis A—A and in their normal positions cooperate with the wing to define a normal air-foil as shown by solid line construction in Figure 2. In their lowered positions the flaps are drooped with respect to the wing substantially as shown by broken line construction in Figure 2. The mechanism 24 is located in the fuselage of the plane with its output shaft in line with the torque tubes 26. Fluid flow to the mechanism is controlled by a conventional four-way valve 28 operable between first and second full open positions by means of a pilot's control unit 29 and a cable system 31. Pressurized fluid may be directed to the mechanism 24 through either of a pair of fluid lines 32 or 33. Accordingly the output shaft of the mechanism 24 may be rotated in a clockwise or counter-clockwise direction in a manner presently explained. Pressure line 37 and return line 38 extend between a source of fluid 40, at super-atmospheric pressure, and a fluid return reservoir (not shown), respectively.

The principal parts of the mechanism 24 consist of a reversible rotary type hydraulic motor 41, a torque absorbing assembly 42 symmetrically constructed about a common axis, a driving shaft 43, and gearing 44 and 46, as best seen in Figures 4 and 5. The above parts are inclosed within a protective casing 39. The assembly 42 is positioned between the driving shaft 43 and the output shaft 47 of the hydraulic motor and is further positioned so that its common axis is in parallel spaced relation with the axes of the above-mentioned shafts. The assembly 42 comprises a solid resilient shaft 48 surrounded throughout a major portion of its length by a resilient tube 49. The shaft 48 and tube 49 are joined together by splines at their end portions, opposite the gearing 44 and 46, these splines making possible the transfer of rotary movement between the shaft 48 and tube 49. The shafts 43 and 47, assembly 42, and the gearing 44 and 46 are rotatably mounted in bearings supported by structure 51 which is secured to the casing 39. Rotary movement of the shaft 47 is transmitted to the assembly 42, in a conventional manner by the gearing 44, and is in turn transmitted to the driving shaft 43 by the gearing 46.

A screw thread 52 is provided on the outer surface of the tube 49 and mates with the threads of a nut member 53 mounted thereon. Upon rotation of the tube 49 the nut member is moved thereon, between spaced upstanding portions 57 and 58 of the structure 51, with a translatory movement. The nut member is restrained from rotating with the tube 49 by an arm 54 extending normal thereto and embracing a rod member 56 extending between the upstanding portions 57 and 58. An adjustable abutting screw 59 is secured to a depending portion of the nut member and functions in a manner which will be apparent presently.

Mounted on the tube 49 at each of its ends is a pawl member 61. The pawl constitutes an integral part of a collar or the like keyed to the shaft 49 for rotation therewith. Also mounted at each end of the tube 49 are stop members 62 and 63. The stop members surround the tube 49 and are pivotally attached at their lower portions to the upstanding portions 57 and 58. The stop members are contacted by the screw 59, as the nut member 53 reaches the end of its travel on the tube 49, pivoting them into the path of respective pawls. Contact of either pawl with its respective stop member effectively arrests rotary movement of the tube 49 and accordingly rotary movement of the other parts of the mechanism 24. The pitch of the screw 52 is of sufficient magnitude so that one revolution of the tube 49 causes a stop member to contact its respective pawl or completely free itself in accordance with the direction of rotation of the tube. Undesirable twisting action of a stop member when contacted by a pawl is precluded by its upper portion entering a groove provided by lugs 66 extending from and formed integral with upstanding portions 57 and 58. When the stop members are not in contact with a respective pawl, or at such times as they are being urged into contacting relationship with a respective pawl, they are caused to assume a spaced position by a spring 64 and stop 65, substantially as shown in Figure 5. The operation and advantages of the mechanism 24 will be further discussed in connection with its operation of the flap assembly 10.

Referring again to Figure 1 it will be seen that each end of the driving shaft of the mechanism 24 is attached to the torque tubes 26. Accordingly opposite rotational movement of the motor 41 will actuate the flap assemblies 10 between their normal and lowered positions.

Figure 3:
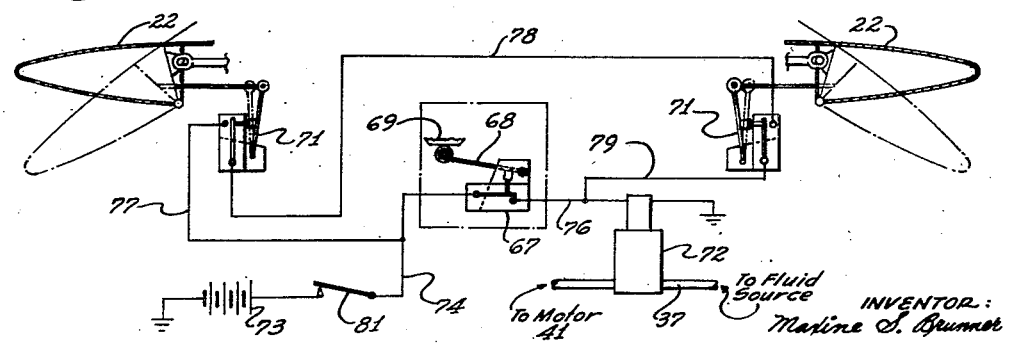
Figure 3 is a diagrammatic view of the electrical circuit and switch means showing their relation with other parts of the instant invention.

In the event certain portions of the flap operating mechanism become damaged means are provided rendering the mechanism 24 inoperative. In Figure 3 the two outboard flaps 22 are diagrammatically shown in spaced relationship, also a solenoid actuated fluid shut-off valve 72 which when energized permits pressurized fluid flow through the line 37 to the motor 41. An electric switch 67 is actuated in response to translatory movement of the nut member 53. An actuating arm 68 of the switch 67 contacts an integral portion 69 of the nut member 53 to effectively close the switch 67. The switch 67 is adjusted so that the arm 68 and portion 69 are in contact at such times as the flaps 22 are in their normal positions and maintains the switch closed through the first two degrees (2°) of their range adjacent their normal positions. Throughout the remainder of the range of the flaps 22 the switch 67 is open. A pair of switches 71 are responsive to movement of the flaps 22, one being located adjacent each outboard flap. The switches 71 are open at such times as the flaps 22 are in their normal positions and remain open through the first one and three quarters degrees (1¾°) of their range adjacent their normal positions. Throughout the remainder of the range of the flaps 22 the switches 71 are closed. Thus it is seen the solenoid valve 72 will be energized by the electric power source 73, current flowing through the switch 67 and conductors 74 and 76, at such times as the flaps 22 are in their normal positions and the first two degrees of their range adjacent their normal positions. Also the solenoid valve 72 will be energized by the electric power source 73, current flowing through the switches 71 and conductors 74 and 76 to 79, inclusive, at such times as the flaps 22 are operating throughout their entire range except the first one and three quarters degrees (1¾°) adjacent their normal positions. A manually operated switch 81 is provided in the conductor 74 whereby the solenoid valve 72 may be deenergized when desired.

The novel features and advantages of the instant invention will become apparent from the following description of its operation. At the beginning of an operating it is assumed the unitary flaps are in their normal positions. At this time the nut member 53 will be in its extreme left hand position, the switch 67 closed, and the solenoid valve energized. Accordingly fluid at superatmospheric pressure is in communication with the motor 41. Inasmuch as the stop member 63 and pawl 61 are in contacting relationship at this time the motor 41 will be stalled but will continue to exert torque to maintain the stop and pawl in firm contacting relationship. During the time the motor 41 is stalled, under the conditions described above, it may be assumed that pressurized fluid communicates therewith tending to rotate the motor in a clockwise direction as viewed from the left in Figure 4.

To effect movement of the unitary flaps from their normal to their lowered positions the direction of rotation of the motor 41 is reversed. This is accomplished by positioning the valve 28, through the control unit 29 and cable system 31, so that pressurized fluid is directed to the motor 41 causing it to rotate counterclockwise. The first revolution of the tube 49 frees the stop member 63. It should be apparent that no binding of parts occurs as the stop element is freed. The nut member 53 continues to move to the right on the tube 49 until it contacts the stop member 62 and pivots it into contacting relation with its respective pawl 61. Contact of the stop member 62 and pawl 61 arrests rotary movement of the various parts of the mechanism 24 and locates the flaps in their lowered positions. The motor 41 is again in a stalled condition. The motor, however, maintains torque in the shaft 48 and tube 49 effectively maintaining the stop member 62 and pawl 61 in firm contacting relationship until reversed.

In view of the above discussion it is seen that rotary movement of various parts of the mechanism 24 is arrested. Also that the unitary flaps are positioned in their lowered position without utilizing an extensive feedback mechanism for controlling fluid flow to the motor 41 and to arrest this flow at the proper time. It will also be apparent that maximum torque loads occur in the shaft 48 and tube 49 instantaneously due to the sudden stoppage of the rotary movement of these elements and the motor 41. These maximum torque loads, however, are not transmitted to the driving shaft 43 but are arrested by the stop members 62 and 63 and respective pawls 61 and absorbed by the resilient shaft 48 and 49. Accordingly the driving shaft 43 will only be subjected to operating loads, that is only the torque required to raise and lower the flap assemblies. Thus the driving shaft 43, also the torque tubes 26, may be of lighter construction than would otherwise be necessary if they were subjected to full maximum torque loads. For the reasons discussed above the mechanism 24 may be of lighter construction than conventional units as operating parts of the mechanism are eliminated and others are reduced in size and weight.

Figure 2:
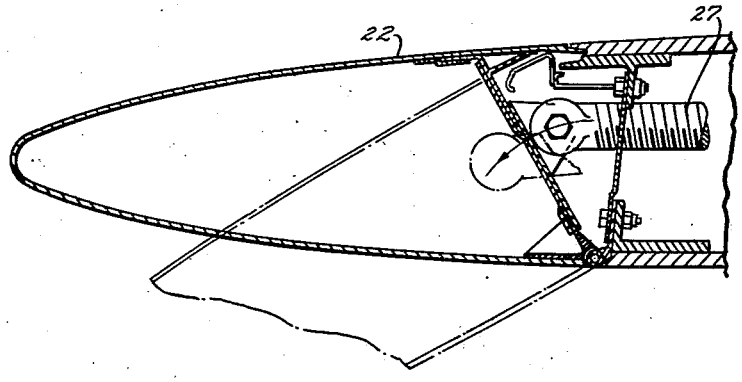
Figure 2 is a sectional view of the wing shown in Figure 1 taken on the line 2—2 thereof.

As the flap assemblies are returned to their normal positions it will be apparent that the construction of the mechanism will provide the same advantages as discussed in connection with the lowering of the flap assemblies. Accordingly further discussion in this connection is not deemed necessary. It should be noted, however, that in the normal positions of the flap assemblies the skin comprising the upper covering of each unitary flap assumes an abutting relationship with the wing's upper skin prior to the time the stop member 63 contacts the pawl 61. This insures that this juncture of the flaps and wing provides a clean aerodynamic surface as shown in Figure 2. The unitary flaps are rigged so that the outboard flap 22 is returned to its aforementioned abutting relation with the wing slightly before flap 21, flap 21 slightly before flap 19, etc., flap 17 being the last to assume its abutting relationship. This sequence insures that each flap will be in a proper abutting relation with the wing when in their normal positions.

Assuming now the flap assemblies become damaged by enemy gunfire or the like at such time as they are in their normal positions rendering one assembly inoperative. Lowering the unitary flaps of one assembly while the other assembly remains in its neutral position would unquestionably prove disastrous to the plane with which they are associated. Should such a condition arise the switches 71 will fail to function as outlined above. During the first two degrees (2°) of movement of the flaps 22 the switch 67 will be closed and the solenoid valve 72 energized. However after the first two degrees (2°) of movement the switch 67 will be opened, one of the switches 71 associated with the damaged flap assembly (which normally should have closed after one and three quarters degrees (1¾°) of flap movement) will remain open, the solenoid valve 72 will be de-energized, and flap movement will be arrested. Damage in connection with any of the inboard flaps, rendering the flaps 22 inoperative, will in turn render the mechanism 24 inoperative as the switches 71 are actuated by the outboard flaps 22. Also should the torque tubes 26 be severed at any point throughout their length the mechanism 24 will be rendered inoperative immediately after the non-damaged flap assembly has been lowered two degrees (2°).

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. In an aircraft having at least one control surface mounted thereon for pivotal movement between neutral and non-neutral positions, apparatus for actuating said control surface, comprising: a tubular member connected to said control surface so that rotary movement of said tubular member imparts pivotal movement to said control surface; a rotary type reversible hydraulic motor having an output shaft; a driving shaft spaced from said output shaft and mounted in said aircraft and being connected to impart rotary movement to said tubular member; a tubular type torque assembly mounted between said output and driving shafts; means on said output and driving shafts and torque absorbing member for imparting rotary movement therebetween; a source of pressurized fluid continuously communicating with said motor and being capable of imparting bidirectional rotation thereto according to the direction of fluid flow to said motor; means for reversing the flow of fluid to said motor; and stop means associated with said torque absorbing assembly adapted to arrest rotary movement of said driving shaft and relieve the latter of any torque loads originating in said motor after the driving shaft has rotated through a predetermined number of revolutions necessary to move said control surface between said neutral and non-neutral positions.

2. The combination with an airplane having a pair of control surface assemblies mounted on respective wings of said aircraft for pivotal movement through an operating range between neutral and non-neutral positions, of apparatus for actuating said assemblies, comprising: a pair of tubular members connected respectively to each of said assemblies so that pivotal movement is imparted to the latter in response to rotary movement of said tubular members; a rotary type reversible hydraulic motor having an output shaft; a driving shaft spaced from said output shaft and extending between and connected to most adjacent ends of said tubular members to impart rotary movement thereto; a tubular type torque assembly mounted between said output and driving shafts; means on said output and driving shafts and torque assembly for imparting rotary movement therebetween; a source of pressurized fluid normally continuously communicating with said motor through fluid lines and being capable of imparting bidirectional rotary movement thereto according to the direction of fluid flow to said motor; valve means in said fluid lines for reversing fluid flow to said motor; and stop means associated with said torque assembly adapted to arrest rotary movement of said driving shaft and relieve the latter of any torque loads originating in said motor after the latter has rotated through a predetermined number of revolutions necessary to move said assemblies through said operating range.

3. Apparatus as set forth in claim 2: further characterized in that each of said assemblies includes a plurality of unitary control surfaces aligned spanwise on the wings of said airplane; a solenoid actuated valve located in said fluid lines adapted to allow or arrest fluid flow to said motor at such times as the solenoid of said valve is energized or de-energized, respectively; an electrical power source; a first electric circuit including first switch means connected in series with said power source and solenoid; said first switch means being responsive to movements of said stop means whereby said solenoid is energized at such times as said assemblies are in said neutral positions or operating in a predetermined portion of said operating range located adjacent thereto and de-energized throughout the remainder of said operating range; a second electric circuit including a pair of switch means connected in series with said power source and solenoid; each one of said pair of switch means being responsive to movements of a respective outermost one of said control surfaces whereby said solenoid is de-energized at such times as said assemblies are in said neutral positions or operating in said predetermined portion of said operating range adjacent thereto and energized throughout the remainder of said operating range.

4. In a hydro-mechanical device the combination, comprising: a support structure including a base and opposed spaced portions extending normal to said base; a reversible type rotary hydraulic motor mounted on said structure and having an output member; a source of liquid at superatmospheric pressure; a conduit assembly including valve means extending between said motor and liquid source and allowing pressurized liquid from the latter to communicate with said motor throughout the operating range of said valve means; the operating range of said valve means consists of a first position in which liquid is directed to said motor to urge the latter in one angular direction and a second position in which liquid is directed to said motor to urge the latter in the other angular direction;

a driving shaft and an elongated torque absorbing assembly the latter being constructed symmetrical about a longitudinal axis thereof; said driving shaft and assembly being rotatably mounted on and extending between said spaced portions; said driving shaft being spaced from said motor, and said assembly being located between said output and driving shafts; driving means on said output and driving shafts and said assembly adapted to impart rotary movement therebetween; and stop means on said structure and driving shaft adapted to arrest rotary movement of the latter at predetermined times during the operation of the device.

References Cited in the file of this patent

UNITED STATES PATENTS

| | | |
|---|---|---|
| 1,038,800 | Tallon | Sept. 17, 1912 |
| 1,540,870 | Adams | June 9, 1925 |
| 1,997,444 | Wilson | Apr. 9, 1935 |
| 2,001,736 | Larason | May 21, 1935 |
| 2,020,951 | Lemon | Nov. 12, 1935 |
| 2,286,516 | Swanson | June 16, 1942 |
| 2,315,270 | Palmer | Mar. 30, 1943 |
| 2,316,235 | Gast | Apr. 13, 1943 |
| 2,394,405 | Schjolin | Feb. 5, 1946 |
| 2,491,812 | Hoffacker | Dec. 20, 1949 |
| 2,502,573 | Lee | Apr. 4, 1950 |
| 2,504,096 | Wells | Apr. 11, 1950 |
| 2,698,526 | Beier | Jan. 4, 1955 |

FOREIGN PATENTS

| | | |
|---|---|---|
| 13,237 | Great Britain | of 1894 |
| 582,680 | France | Oct. 18, 1924 |